United States Patent [19]
Zechmair et al.

[11] 3,958,125
[45] May 18, 1976

[54] X-RAY CASETTE WITH A SNAP-ACTION CLOSURE SYSTEM

[75] Inventors: Wilhelm Zechmair, Langenmoosen; Hans Josef Müller-Rech, Schrobenhausen, both of Germany

[73] Assignee: AGFA-Gevaert, A.G., Leverkusen, Germany

[22] Filed: Dec. 6, 1974

[21] Appl. No.: 530,170

[30] Foreign Application Priority Data
Dec. 12, 1973 Germany............................ 2361768

[52] U.S. Cl............................. 250/480; 250/481; 292/162; 354/281
[51] Int. Cl.² ......................................... G03B 41/16
[58] Field of Search................... 250/481, 475, 480; 354/281; 292/162

[56] References Cited
FOREIGN PATENTS OR APPLICATIONS
1,096,741  2/1959  Germany ............................ 250/481
414,222  6/1925  Germany ............................ 250/475

*Primary Examiner*—Alfred E. Smith
*Assistant Examiner*—T. N. Grigsby
*Attorney, Agent, or Firm*—Connolly and Hutz

[57] ABSTRACT

The X-ray cassette consists of a substantially rigid lower section and a resilient cover which has a convex curvature relative to the inside of the cassette in its non-distorted state. The closure system is in the form of a snap-action closure system, consisting of a bar which is displaceable parallel to the front of the cassette in the lower section thereof and which is formed with beads or has cams rivetted or soldered onto it. When the cassette cover is pressed against the lower section of the cassette, these cams or beads engage in corresponding beads or cams on the end face of the cassette cover.

2 Claims, 5 Drawing Figures

U.S. Patent  May 18, 1976  Sheet 1 of 2  3,958,125
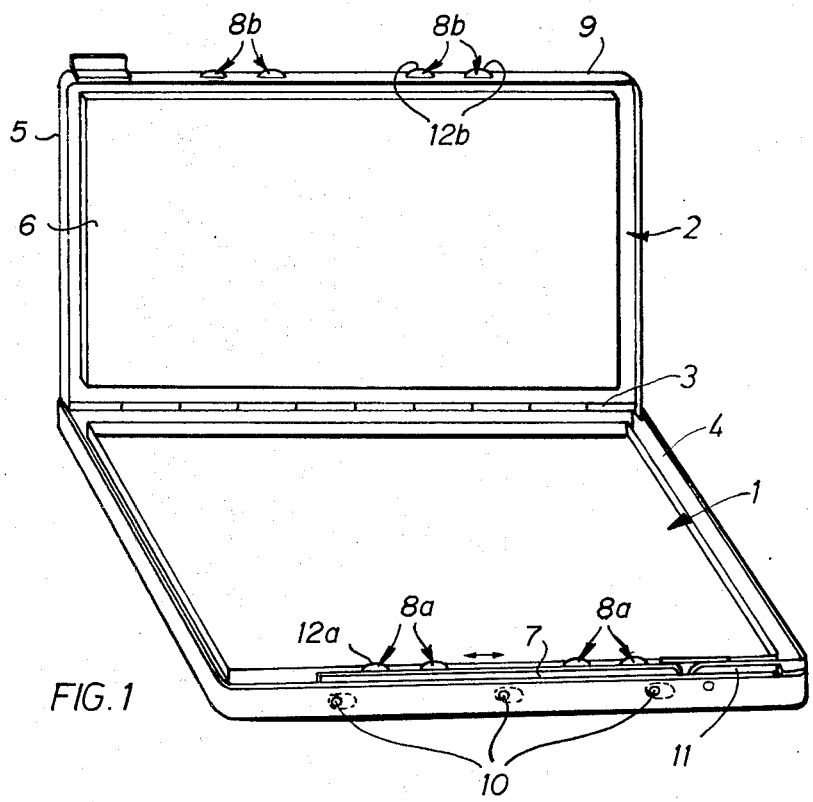
FIG. 1
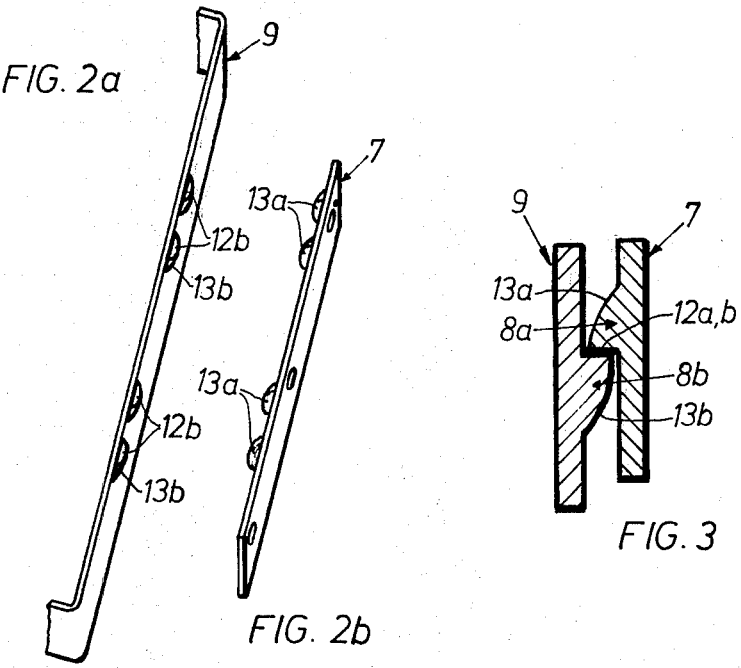
FIG. 2a
FIG. 2b
FIG. 3

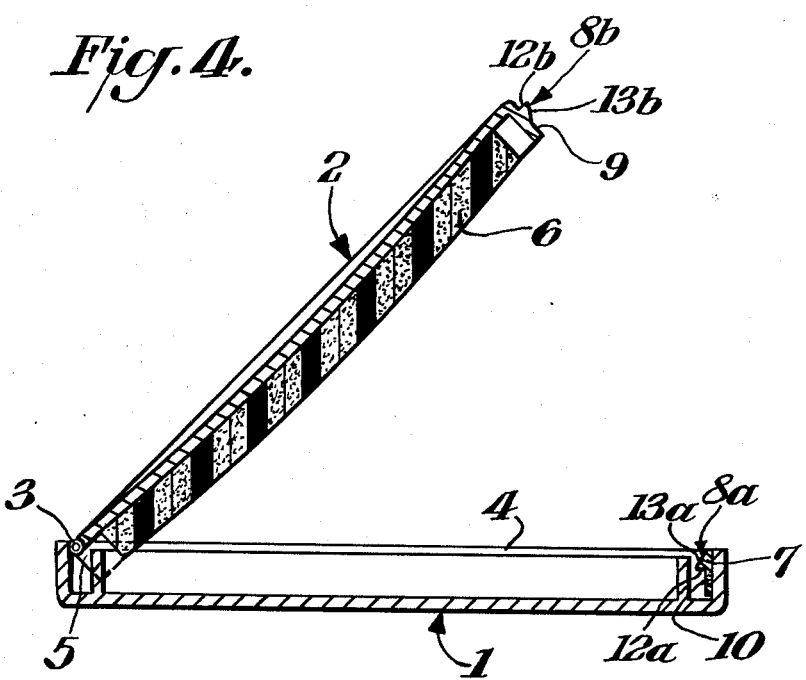

X-RAY CASETTE WITH A SNAP-ACTION CLOSURE SYSTEM

This invention relates to an X-ray cassette with a snap-action closure system. X-ray cassettes are used in large numbers in X-ray installations both in hospitals and in X-ray institutes. They normally consist of a substantially rigid lower section and a resilient upper section. In its non-distorted state, the upper section has a curvature directed away from the bottom of the cassette. When the cassette is closed, a padded inner surface of the upper section of the cassette comes into contact with the surface of the film, preventing the inclusion of air bubbles. When the cassette is closed, the pad is slightly compressed so that the film is absolutely flat in the cassette and is unable to move sideways. Accordingly, the cassette has to be closed against the resilient resistance of the pad. It is known that the cassette can be provided with a snap-action closure system for this purpose. A closure system of this kind is particularly simple to operate. The upper section of the cassette only has to be pressed against the bottom of the cassette to bring the snap-action closure system into operation. An object of the present invention is to provide an improved snap-action closure system.

Over recent years, so-called daylight systems have been developed for X-ray cassettes for reasons of rationalization. The daylight systems consist of an elaborate apparatus in which a cassette loaded with an exposed film is opened in the dark, and the exposed film is then removed and carried to a developing station. The cassette is then loaded with fresh, unexposed film and closed again. All these steps are carried out automatically. It is obvious that the closure system with which the cassettes are provided must be designed to suit the mode of operation of such an apparatus. In other words, the closure system has to be "machine-compatible". In particular, the closure system should be such that opening and closing of the cassette involves as few steps as possible.

According to the invention there is provided an X-ray cassette comprising a substantially rigid lower section, a resilient cover which has a convex curvature relative to the inside of the cassette in the absence of external forces, and a snap-action closure system for closing the cassette, the snap-action closure system comprising a bar which is displaceable parallel to the front of the cassette in the bottom part thereof and which is formed with beads or cams which, when the cover is pressed against the lower section, engage with corresponding beads or cams in an end face of the cassette cover.

In one preferred embodiment of the invention, the beads or cams in the end face and in the displaceable bar are precurved and each have one flat surface parallel to the lower and upper sections of the cassette. When the cassette is closed, the beads on the displaceable bar and the beads on the end face are opposite one another. In addition, the beads or cams facing one another on the displaceable bar and end face are oriented at 180° relative to one another in the plane of the end face and displaceable bar. In other words, the flat surface of the beads or cams on the end face is for example directed upwards, whilst the flat surface of the beads on the displaceable bar is directed towards the base of the cassette. A particularly reliable closure system is obtained in this way.

The bar mechanically coupled with the closing lever is preferably provided with a spring so that it automatically returns to its starting position after the cassette has been opened.

When the cassette is closed, the bar must be able to yield to some extent perpendicularly of its direction of movement. Accordingly, the material of which the bar is made must have a high degree of resilience. The bar preferably consists of fine steel.

The advantage of the closure system according to the invention is that it is easy to operate. It is only necessary to apply pressure to close the cassette. The beads or cams then engage one another automatically. To open the cassette, the closing lever is turned upwards. Through the displacement of the bar, the beads or cams are disengaged from one another, releasing the upper section of the cassette. In addition, the closure system according to the invention is easy to assemble and has a long service life.

One embodiment of the invention is described by way of example in the following with reference to the accompanying drawings, wherein:

FIG. 1 is a perspective view of the cassette.

FIG. 2a shows the end face of the upper part of the cassette formed with beads.

FIG. 2b shows the bar with corresponding beads displaceable in the lower section of the cassette.

FIG. 3 shows the relative position of the beads when the cassette is closed.

FIG. 4 is a side elevational-view in cross section of the cassette of FIG. 1 with convex bowing of upper section slightly exaggerated.

The X-ray cassette shown in FIG. 1 comprises a lower section 1 and an upper section 2 which is joined to the lower section 1 through hinges 3. Both sections of the cassette are surrounded by rigid frames 4, 5. A foam pad 6 is bonded to the upper section 2 of the cassette. To close the cassette, the upper section 2 is pivoted towards the lower section 1 on the hinges 3. When the cassette is open, the upper section 2 is curved slightly outwards as shown in FIG. 4. When the cassette is closed, the two sections 1 and 2 are completely plane-parallel.

The cassette closure system is formed by a displaceable bar 7 with beads 8a and by beads 8b on an end face 9 of the upper frame 5. The beaded bar 7 is mounted for displacement on the front of the lower section of the cassette by means of the studs 10. When a closing lever 11 is operated, the beaded bar moves parallel to the front of the lower section of the cassette (cf. arrow).

The beads are shown somewhat more clearly in FIGS. 2a and 2b. As seen from above, the beads 8b on the end face 9 of the upper section 2 consist of a surface 12b measuring approximately 1 × 5 mm and oriented parallel to the plane of the cassette, and of a curved underlying surface 13b projecting from the end face 9.

The beads 8a on the displaceable bar 7 (FIG. 2b) are identical or similar in shape to the beads 8b on the end face 9 of the cassette, but are turned through 180° relative to them. In this position, the flat surfaces 12a of the beads on the displaceable bar 7 lie underneath (looking from above). They are adjoined in the upward direction by the curved section 13a.

When the cassette is closed, the beads 8a and 8b are exactly opposite one another. When the upper section 2 of the cassette is pressed against the lower section 1, the curved surfaces 13a and 13b of the beads 8a and 8b slide on one another. At the same time, the bar 7 yields to some extent perpendicularly of its direction of movement. When the cassette is further compressed, the beads 8a, 8b engage in such a way that the flat surfaces 12a, 12b come to rest on one another (cf. FIG. 3). The cassette is then safely closed. The configuration of the beads and their relative position is shown in detail in FIG. 3.

If it is desired to open the cassette, the closing lever 11 is turned upwards either manually or by machine. As a result, the bar 7 in FIG. 1 moves to the left and the flat surfaces 12a, 12b of the beads 8a, 8b slide on one another. Finally, the beads 8a on the bar 7 and 8b on the end face of the cover are staggered from one another to such an extent that the surfaces 12a and 12b are no longer in contact with one another. The upper section 2 of the cassette then springs open under the effect of the tension inherent in it and the resilience of the pad 6 to such an extent that the cassette can readily be completely opened by lifting the upper section 2. In cases where cassettes are automatically opened, as in daylight systems, all that is necessary for this purpose is to insert a roller between the cassette cover and the bottom part of the cassette.

The closing lever 11 is provided with a spring which, after the cassette has been opened, pulls the bar 7 and the closing lever 11 back into their respective starting positions. The beads 8a and 8b are formed either by means of punching tools or by pressing. Fine steel has proved to be an effective material for the bar 7 and the frame member 9 on the end face of the upper section 2.

What we claim is:

1. An X-ray cassette comprising a substantially rigid lower rectangular tray section, having a peripheral rim, a resilient rectangular cover having a peripheral rim and a slight convex curvature in its free state relative to the rim of the lower rectangular tray section, a snap-action closure system for closing the cassette and flattening the convex curvature of the cover against the peripheral rim of the lower tray section, hinge means connecting rear portions of the resilient rectangular cover and lower rectangular tray section, a thin bar, slide means mounting the thin bar within the peripheral rim of the lower rectangular tray section remote from the hinge, projections on the outside of the front of the rim of the resilient rectangular cover and on the thin bar which are aligned with each other when the cover is closed down on the lower rectangular tray section, the projections each having tapered surfaces directed toward each other when the cover is slightly raised above the lower rectangular tray section, the projections each having substantially flat interengaging shoulder surfaces which engage each other when the rectangular cover is pressed downwardly into full engagement with the lower rectangular tray section whereby the cover is resiliently locked to the lower rectangular tray section against the resiliency of the convex curvature of the cover, a lever movably mounted on the lower rectangular tray section and connected to the thin bar whereby movement of the lever shifts the thin bar longitudinally to missalign its projections with those on the front rim of the cover whereby the flat shoulder surfaces of the projections on the thin bar are shifted out of line with those on the front rim of the cover whereby the cover is released and allowed to be opened by the resilient convex curvature away from the lower rectangular tray section.

2. An X-ray cassette as set forth in claim 1 wherein a pad of resilient material is disposed within the rectangular cover for helping confine material in the lower rectangular tray section when the cover is closed and locked upon it.

* * * * *